United States Patent [19]

Nagano

[11] Patent Number: 4,975,310
[45] Date of Patent: Dec. 4, 1990

[54] SUBSTRATE FOR INFORMATION RECORDING MEDIUM AND PRODUCTION METHOD THEREOF

[75] Inventor: Kazumi Nagano, Fujisawa, Japan

[73] Assignee: Canon Kabushiki Kaisha, Tokyo, Japan

[21] Appl. No.: 344,758

[22] Filed: Apr. 28, 1989

[30] Foreign Application Priority Data

Apr. 28, 1988 [JP] Japan .................................. 63-103801

[51] Int. Cl.$^5$ ............................................. B32B 3/00
[52] U.S. Cl. ......................................... 428/64; 428/65; 428/913; 369/275.1; 369/284; 369/288; 346/76 L; 346/135.1; 264/104; 264/106
[58] Field of Search .................... 428/64, 65, 913; 369/275, 284, 288; 346/76 L, 135.1; 264/104, 106

[56] References Cited

U.S. PATENT DOCUMENTS 4,389,719  6/1983  van de Doak et al. ............... 428/64

FOREIGN PATENT DOCUMENTS 1092450  5/1986  Japan .

*Primary Examiner*—Patrick Ryan
*Attorney, Agent, or Firm*—Fitzpatrick, Cella, Harper & Scinto

[57] ABSTRACT

A substrate for an information recording medium having an uneven preformat on its face side and a specular surface on its rear side is characterized by having a degree of crosslinking which is higher at the specular surface than the face side having the uneven preformat. Methods for producing this substrate are also disclosed.

12 Claims, 1 Drawing Sheet

SUBSTRATE FOR INFORMATION RECORDING MEDIUM AND PRODUCTION METHOD THEREOF

BACKGROUND OF THE INVENTION

1. Field of the Invention

The present invention relates to a substrate for an information recording medium in which information is optically recorded and reproduced as well as to a method of producing the same.

2. Description of the Related Art

There have hitherto been methods of reading of signals from optical cards. In one of these methods, signals are detected from the phase difference between beams of laser reflected from recorded and unrecorded portions. In another method, signals are detected using the difference between the amount of beams of laser reflected from recorded and unrecorded portions. In both methods, an incident laser beam passes through a substrate protection layer and the substrate, reaches the surface of a recording medium, passes again through the substrate and the protection layer and reaches a reader.

Thus, it is important that the optical card be devoid of dust, cracking, optical distortion or the like so that signals can be read precisely. In particular, the substrate surfaces of optical cards which used portably are frequently susceptible to such damage. In order to prevent this type of damage, U.S. Pat. No. 4,673,626 discloses an optical recording card in which the surface hardness is increased (by forming a cured surface layer 36 on a substrate 35, as shown in FIG. 5, inter alia, column 16, line 36 to column 17, line 18).

A known method of providing such a hard coating layer involves dissolving a hard coating material in a solvent such as ethyl acetate, toluene, Cellosolve acetate ® (ethylene glycol monoethyl ether acetate manufactured by the Union Carbide Corp.) or the like (referred to as "hard coating solvent" hereinafter), and applying the resultant solution to the surface of a substrate by a spinner method, roll coater method, dipping method, spray method or the like. However, when these hard coating layers are provided on a transparent substrate, the hard coating solvent partially dissolves the surface of the substrate or the creates microcracks roughening the substrate surface. Disadvantages are therefore encountered in that the reflectance ratio and the level of the tracking servo signal are reduced, noise occurs during recording and reproducing, and recording and reproducing will thus become impossible.

Japanese Patent Laid-Open No. 92450/1986 discloses a substrate for an optical recording medium which is formed by providing a cured coat of ultraviolet curable resin on the specular surface of a casting mold. The cured coat is then transferred to the surface of a cured resin obtained by casting and curing epoxy resin. This method, however, requires forming a transfer coated resin layer in the specular mold of a casting apparatus for each molding and is thus unsuitable for mass production. Moreover, since this method uses a resin having a high glass transition temperature to obtain suitable heat resistance, recording sensitivity is significantly reduced. That is, since information recording is performed by evaporating and melt deforming the recording layer by laser beam absorption, if the substrate in contact with the recording layer has a high glass transition temperature, the recording sensitivity decreases due to the fact that deformation of the recording layer is inhibited.

SUMMARY OF THE INVENTION

Accordingly, the present invention is intended to resolve the above-described disadvantages of the prior art, and thus, it is an object of the present invention to provide a substrate for an information recording medium in which the surface upon which a recording/reproducing beam is made incident is not easily damaged, and in which recording sensitivity is not reduced.

It is another object of the present invention to provide a substrate for an information recording medium which allows for providing an optimum hard coating layer by a coating method utilizing a hard coating solvent selected from a wide range of solvents.

It is a further object of the present invention to provide a method of producing substrates for information recording media which is capable of preventing the surface upon which a recording/reproducing beam is made incident from being easily damaged, and which allows a hard coating solvent to be selected from a wide range of solvents and which allows for provision of an optimum hard coating by a coating method, as well as preventing any reduction in recording sensitivity.

A substrate for an information recording medium of the present invention has an uneven preformat on its face side and is characterized in that the specular surface on the rear side of the substrate is formed by employing resin having a higher degree of crosslinking than that of the face surface having the uneven preformat.

The method of producing a substrate for an information recording medium having an uneven preformat on its face side in accordance with the present invention is characterized by forming on the rear side of the substrate the surface upon which a recording/reproducing beam is made incident with a degree of crosslinking higher than that of the face side having the uneven preformat.

The substrate for an information recording medium of the present invention is formed such that the rear side of the substrate which does not have an uneven preformat and serves as the surface upon which a recording/reproducing beam is made incident has a degree of crosslinking which is higher than that of the face side having the uneven preformat. Since the rear surface of the substrate therefore has excellent chemical stability and a high degree of hardness, it is possible to prevent roughness, cracking and the like from occurring thereon due to the solvent used for forming a hard coating layer by a coating process and the effect of the hard coating is improved. Since the surface which is in contact with the recording layer and has the uneven preformat formed thereon has a low degree of crosslinking, such surface has a relatively low degree of hardness and a low glass transition temperature. Therefore, the substrate surface is deformed by exothermic deformation of the recording layer when pits in the recording layer are formed during recording. Thus deformation of the recording layer is not inhibited and there is no reduction in the recording sensitivity.

DETAILED DESCRIPTION OF THE PREFERRED EMBODIMENTS

The present invention is described below with reference to the drawings.

Figure 1:
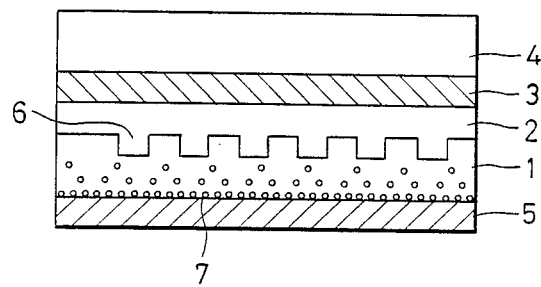
FIG. 1 is a schematic sectional view of an embodiment of an information recording medium which uses the substrate of the present invention.

FIG. 1 is a sectional view of an embodiment of an optical information recording carrier which utilizes the substrate for an information recording medium of the present invention. In FIG. 1, the information recording medium substrate in accordance with the present invention has a specular surface 7 formed on the rear side of a transparent resin substrate 1 and a grooved surface 6 with an uneven preformat pattern formed on the face side of the substrate 1, wherein specular surface 7 is formed of resin having a higher degree of crosslinking than that of the groove surface 6. In the resin substrate 1, the degree of crosslinking gradually increases from the preformat surface 6 to the specular surface 7.

The optical information recording carrier comprises the above-described substrate for an information recording medium, an optical recording layer 2 which is formed on the groove surface 6 using a recording material such as a dye or the like, a protecting or backing material 4 for supporting the recording carrier which is bonded to the optical recording layer 2 with an adhesive layer 3 therebetween, and a hard coating layer 5 which is provided on the specular surface 7 on the rear side of the information recording medium substrate.

Examples of the resin that may be used for forming transparent resin substrate 1 of the present invention include transparent thermosetting resins such as phenolic resin, epoxy resin, polyester resin and the like; photosetting resins and thermoplastic resin such as vinyl resin, styrene resin, acrylic resin, polycarbonate resin, acetate resin, polyester resin and the like, all of which have generally been used in substrates for information recording media.

The resin substrate also has a rear surface, i.e., the surface upon which the recording/reproducing beam is made incident, which has a degree of crosslinking that is higher than that of the face surface having the uneven preformat.

The substrate of the present invention may be formed by laminating together two or more members with different degrees of crosslinking or by gradually changing the degree of crosslinking of a single layer from the face side toward the rear side. However, since using of resins with different monomer components on the rear and face sides of the substrate causes an optical anisotropy in the substrate, thus adversely affecting recording and reproducing performance, it is highly preferable to use resins on the face and rear sides of the substrate which have substantially the same repeating units.

A description will now be given of the method of producing the information recording medium substrate of the present invention.

Figure 2:
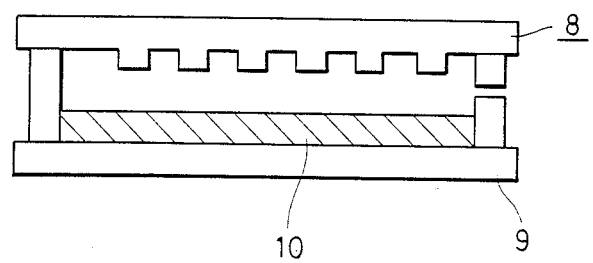
FIG. 2 is a schematic sectional view of an embodiment of an apparatus for producing a substrate for an information recording medium in accordance with the present invention.

FIG. 2 is an explanatory view of a casting apparatus used in an embodiment of the method of producing the information recording medium substrate of the present invention. In this method, an information recording medium substrate of the present invention can be obtained by first providing a crosslinking agent layer 10 on a specular mold 9 which is then placed in a casting apparatus 8, injecting liquid transparent resin into the mold by a normal casting method, solidifying the resin and then releasing it from the mold. In this manner, the specular surface of the substrate formed by molding automatically has a degree of crosslinking which is higher than that of the preformat surface.

For example, if an epoxy resin is to be utilized, examples of crosslinking agents that may be used in the crosslinking agent layer include amines, polyhydric carboxylic acids and anhydrides thereof, phenolic resin, urea resin, melamine resin, polyester resin, polyamide resin and the like.

The optical information recording medium substrate of the present invention can also be formed, for example, by gradually decreasing the ratio of the crosslinking agent contained in the resin injected in the casting apparatus, or laminating thin resin sheets having different degrees of crosslinking and then contact or fusion bonding the assembly together as one unit.

In the present invention, since the hard coating is provided on the surface of the information recording medium substrate which has a higher degree of crosslinking (and which generally, therefore, an enhanced degree of hardness), the effect of the hard coating is further increased.

Examples of hard coating materials that may be used for forming the hard coating layer include polyfunctional acrylic resin, silica resin, urethane resin, melamine resin and the like. Examples of hard coating solvents that may be used without any particular limit include ethyl acetate, toluene, Cellosolve acetate® and the like.

The hard coating layer can be formed by dissolving the hard coating material in the hard coating solvent and then coating the resultant solution on the surface of the resin substrate using spinner, roll coater, dipping or spray methods or the like.

The uneven preformat formed on the face side of the substrate in the present invention provides, for example, tracking grooves serving as guides for a laser beam, information pits (serving as positional information such as start or address pits) and so on. Specifically, the uneven preformat comprises spiral or eccentric optical disc track grooves having a width of 0.5 to 2 μm and a pitch of 1.0 to 5 μm, or parallel track grooves for optical cards with a width of 2 to 5 μm and a pitch of 8 to 15 μm, and information pits having a rectangular form with a length of 10 μm or less and a width of 10 μm or less, or an elliptic form with a major diameter of 10 μm or less.

As described above, since the rear side of the substrate is formed so as to have a degree of crosslinking that is higher than that of the face side thereof having the uneven preformat formed thereon, the present invention provides a substrate for an information recording medium which has a high level of solvent resistance. The substrate also does not decrease recording sensitivity because of the surface of the substrate which contacts the recording layer is deformed with the deformation of the recording layer caused by the laser beam being absorbed in the same way as in conventional substrates. Thus, recording and reproducing characteristics are stabilized.

Since the substrate for an information recording medium of the present invention is not easily eroded by dissolving in the hard coating solvent, the hard coating material can be selected from an extended range of materials, and it is possible to provide a hard coating layer with a higher level of marring resistance. The productivity is also improved because the hard coating layer can be formed by coating.

The hardness of the face side of the substrate of the present invention, measured on the conventional Rockwell scale, is preferably M92 to M98, particularly about M95, and the difference in Rockwell hardness between the face side of the substrate and the rear side thereof is at least a value of 3 and, is preferably 5 or more.

The present invention is described in detail below with reference to various working examples, but the present invention is not limited to the scope of the following examples.

EXAMPLE 1

A thickness of 500 to 1000 Å of 2-ethyl-4-methylimidazole was applied as a crosslinking agent to the specular mold of the casting apparatus shown in FIG. 2. The casting apparatus was assembled by providing spacers with a thickness of 0.4 mm around the periphery of the specular mold. Uncured liquid epoxy resin having the composition described below was injected as liquid resin into the casting apparatus and then cured at 100° C. for 10 hours.

| (Composition) | |
|---|---|
| Bisphenol A epoxy resin | 100 parts by weight |
| Methylhexahydro phthalic anhydride | 88 parts by weight |
| 2-ethyl-4-methylimidazole | 0.3 parts by weight |
| 2,6-di-t-butyl-p-cresol | 1.0 parts by weight |

The cured product was then released from the mold to obtain an optical card substrate having a face side with tracking grooves (width, 3 μm; pitch, 12 μm) as a preformat and a rear side with a specular surface.

The thus-formed substrate was then measured with respect to the hardness of the surface having the preformat formed thereon and the specular surface. The results of the measurements are shown in Table 1.

The substrate produced by the above-described method was also observed using the naked eye and an optical microscope (200 x) regarding the change in the specular surface when such surface was immersed in various hard coating solvents (i.e., ethyl acetate, toluene and Cellosolve acetate) for 12 hours. The results obtained are shown in Table 1.

A solution obtained by dissolving 50% by weight of urethane acrylate as a hard coating material in Cellosolve acetate solvent was applied to the specular surface of the substrate by a dipping method. Afterwards, it was found that the substrate was not eroded by dissolution in the hard coating solvent.

A 2% diacetone alcohol solution of 1,1,5,5-tetrakis-(p-diethylaminophenyl)-2,4-pentadienyl-perchlorate was then applied to the preformat surface of the substrate to form a recording layer having a thickness of 1000 Å and an opaque substrate having a thickness of 0.3 mm was bonded to the recording layer using a hot melt adhesive therebetween to form an optical card. The recording sensitivity of the thus-formed optical card was measured and is also set forth in Table 1.

COMPARATIVE EXAMPLE 1

An optical card substrate was formed in the same manner as that employed in Example 1, exception that no crosslinking agent was applied to the specular surface of the casting apparatus. An optical card was then formed using the substrate in the same way as that employed in Example 1, and the recording sensitivity was measured. The characteristics and solvent resistance of the thus-formed substrate, and the recording sensitivity of the optical card are shown in Table 1.

COMPARATIVE EXAMPLE 2

Liquid acrylic resin having the composition described below was injected into the casting apparatus shown in FIG. 2 and cured in order to form an 85×54 mm optical card substrate with a thickness of 0.3 mm having tracking grooves with a width of 3 μm and a pitch of 12 μm. The characteristics and solvent resistance of the thus-formed substrate are shown in Table 1. An optical card was formed using the substrate in the same way as in Example 1, and the sensitivity was measured and is also shown in Table 1.

| (Composition) | |
|---|---|
| Methyl methacrylate | 70 wt % |
| Tertiary butyl methacrylate | 20 wt % |
| Polyethylene glycol dimethacrylate (molecular weight: 620) | 10 wt % |

EXAMPLE 2

Liquid acrylic resin having the composition (I) described below was injected into the casting apparatus shown in FIG. 2 to form an acrylic resin substrate having a thickness of 0.2 mm.

| Composition (I) (Specular side) | |
|---|---|
| Methyl methacrylate | 70 wt % |
| Tertiary butyl methacrylate | 20 wt % |
| Polyethylene glycol dimethacrylate (molecular weight: 620) | 10 wt % |

Liquid acrylic resin having the following composition (II) was then injected and cured at 120° C. for 10 hours.

| Composition (II) (Face side) | |
|---|---|
| Methyl methacrylate | 70 wt % |
| Tertiary butyl methacrylate | 25 wt % |
| Polyethylene glycol dimethacrylate | 5 wt % |

The cured product was released from the mold to obtain an optical card substrate having a thickness of 0.4 mm and a size of 84 mm×54 mm. The hardness and solvent resistance data of the substrate were obtained and an optical card was formed using the substrate in the same way as that employed in Example 1. The hardness and solvent resistance data and the sensitivity of the optical card are shown in Table 1.

EXAMPLE 3

Three disc-shaped resin substrates having a thickness of 0.4 mm and a diameter of 120 mm were formed with compositions (I), (II) and (III) described below by a casting method. Each of the substrates formed having the compositions (I) and (II) had specular surfaces on its both sides thereof, while the substrate formed with composition (III) had spiral track grooves with a width of 0.6 μm and a pitch of 1.6 μm on one side thereof. These three substrates were then laminated in the order of (I), (II) and (III) such that the preformat surface was placed on the outside and the substrates were contact bonded by being heat-pressed at 140° C. and pressure of 2.5 kg/cm² for 5 minutes to form an optical disc substrate.

| Composition (I) | |
| --- | --- |
| (1) Methyl methacrylate | 70 wt % |
| (2) t-butyl methacrylate | 25 wt % |
| (3) Polyethylene glycol dimethacrylate | 5 wt % |
| Composition (II) | |
| (1) Methyl methacrylate | 70 wt % |
| (2) t-butyl methacrylate | 20 wt % |
| (3) Polyethylene glycol dimethacrylate | 10 wt % |
| Composition (III) | |
| (1) Methyl methacrylate | 65 wt % |
| (2) t-butyl methacrylate | 22 wt % |
| (3) Polyethylene glycol dimethacrylate | 13 wt% |

The hardness and solvent resistance of the substrate were obtained and an optical disc was formed using the substrate in the same way as that employed in Example 1. The hardness and the solvent resistance data and the sensitivity of the optical disc are shown in Table 1.

In the foregoing Examples and Comparative Examples, recording sensitivity was measured in accordance with the following method:

Sweep signals with a pulse width of 20 to 200 μsec were recorded in each of the optical cards formed by bringing the optical cards into reciprocating motion at a write speed. The saturated contrast was then determined from the reproduced signals obtained by reciprocating each of the optical cards at a read speed. The recording sensitivity was calculated from the value of the recording pulse width which showed a level of 90% of the saturated contrast.

Also in the previous Examples and Comparative Examples, the degree of crosslinking of each of the substrates was expressed by the Rockwell hardness on the face side and the rear side of each of the substrates because it is known that the degree of crosslinking is proportional to the hardness of the resin comprising the same monomer as that of the substrates. The Rockwell hardness was measured in accordance with the method specified in ASTM D785.

TABLE 1

| | Rockwell hardness | | Solvent resistance | Recording sensitivity |
| --- | --- | --- | --- | --- |
| | Face side | Specular side | | |
| Example 1 | M95 | M100 | ◎ | 0.95 J/cm² |
| Comparative Example 1 | M95 | M95 | X | 0.95 J/cm² |
| Comparative Example 2 | M103 | M103 | ○ | 1.3 J/cm² |
| Example 2 | M98 | M103 | ◎ | 0.95 J/cm² |
| Example 3 | M98 | M105 | ◎ | 0.95 J/cm² |

In Table 1, the symbol "◎" means that no microcracks or dissolution of the substrate surface was noted using an optical microscope at 200 x; "○" means that microcracks or dissolution of the substrate surface was noted using the optical microscope at 200 x but not using the naked eye; and "X" means that microcracks or dissolution of the substrate surface was noted using the naked eye.

What is claimed is:

1. A transparent substrate for an information recording medium, comprising: a thermoplastic, photosetting or thermosetting resin material, said substrate being a single layer having a face side and a rear side, said face side defining an uneven preformat and said rear side defining a specular surface for receiving an incident recording or reproducing beam, wherein said rear side has a higher degree of resin crosslinking than said face side.

2. A transparent substrate for an information recording medium, comprising: a thermoplastic, photosetting or thermosetting resin material, said substrate having a face side and a rear side, said face side defining an uneven preformat and said rear side defining a specular surface for receiving an incident recording or reproducing beam, wherein said rear side has a Rockwell hardness of at least M3 greater than said face side.

3. The transparent substrate according to claim 2, wherein said face side has a Rockwell hardness of about M92-M98.

4. The transparent substrate according to claim 2, or 3, wherein said rear side has a Rockwell hardness of at least M5 greater than said face side.

5. The transparent substrate according to claim 4, wherein said face side has a Rockwell hardness of about M95.

6. The transparent substrate according to claim 2, wherein said substrate is a single layer.

7. The transparent substrate according to claims 1 or 2, wherein the degree of crosslinking increases gradually from said face to said rear sides.

8. The transparent substrate according to claim 2, wherein said substrate is a fused or contact bonded laminated unit.

9. The transparent substrate according to claims 1 or 2, wherein said face and rear sides have substantially the same repeating resin units.

10. A method of producing a transparent substrate for an information recording medium for receiving an incident recording or reproducing beam, comprising the steps of:
providing a crosslinking agent on a specular mold in a casting apparatus having an uneven preformat surface;
pouring a liquid thermoplastic, photosetting or thermosetting resin into the mold;
solidifying the resin; and
releasing the solidified resin from the mold whereby said substrate is obtained, said substrate having a face side defining said uneven preformat and a rear side defining a specular surface, said rear side of said substrate having a higher degree of resin crosslinking than said face side.

11. A method of producing a transparent substrate for an information recording medium for receiving an incident recording or reproducing beam, comprising the steps of:
pouring a liquid thermoplastic, photosetting or thermosetting resin into a casting apparatus having a specular mold and an uneven preformat surface, said liquid resin containing a crosslinking agent;
decreasing the amount of crosslinking agent in said liquid resin as said resin fills said casting apparatus from said specular mold to said preformat surface;
solidifying the resin; and
releasing the solidified resin from the mold whereby said substrate is obtained, said substrate having a face side defining said uneven preformat and a rear side defining a specular surface, said rear side of said substrate having a higher degree of resin crosslinking than said face side.

12. A method of producing a transparent substrate for an information recording medium for receiving an incident recording or reproducing beam, comprising the steps of:
pouring a liquid thermoplastic, photosetting or thermosetting resin into a casting apparatus having a specular mold and an uneven preformat surface, said liquid resin containing a crosslinking agent;

increasing the amount of crosslinking agent in said liquid resin as said resin fills said casting apparatus from said preformat surface to said specular mold;

solidifying the resin; and releasing the solidified resin from the mold whereby said substrate is obtained, said substrate having a face side defining said uneven preformat and a rear side defining a specular surface, said rear side of said substrate having a higher degree of resin crosslinking than said face side.

* * * * *

UNITED STATES PATENT AND TRADEMARK OFFICE
CERTIFICATE OF CORRECTION

PATENT NO. : 4,975,310

DATED : December 4, 1990

INVENTOR(S) : KAZUMI NAGANO

It is certified that error appears in the above-identified patent and that said Letters Patent is hereby corrected as shown below:

ON THE TITLE PAGE,
AT [56] REFERENCES CITED

U.S. Patent Documents,
        "4,389,719 6/1983 van de Doak et al." should read
        --4,389,719 6/1983 Van de Donk et al.--.
    Foreign Patent Documents,
        "1092450 5/1986 Japan" should read
        --61-92450 5/1986 Japan--.

COLUMN 1

Line 46, "the" (second occurrence) should be deleted.

COLUMN 5

Line 64, "exception" should read --except--.

Signed and Sealed this

Sixth Day of October, 1992

Attest:

DOUGLAS B. COMER

Attesting Officer      Acting Commissioner of Patents and Trademarks